(12) United States Patent
Takahashi et al.

(10) Patent No.: US 6,357,801 B1
(45) Date of Patent: Mar. 19, 2002

(54) FLARED CONNECTION STRUCTURE OF PIPE END PORTION

(75) Inventors: Teruhisa Takahashi, Mishima; Masaaki Akiyama; Kazuteru Mizuno, both of Shizuoka Prefecture; Hiroaki Kondo; Kazunori Takikawa, both of Numazu, all of (JP)

(73) Assignee: Usui Kokosai Sangyo Kaisha Limited (JP)

( * ) Notice: Subject to any disclaimer, the term of this patent is extended or adjusted under 35 U.S.C. 154(b) by 0 days.

(21) Appl. No.: 09/467,452

(22) Filed: Dec. 20, 1999

(30) Foreign Application Priority Data

Dec. 28, 1998 (JP) ............................................. 10-373729

(51) Int. Cl.[7] ................................................. F16L 25/00
(52) U.S. Cl. ..................................................... 285/334.5
(58) Field of Search ............................. 285/334.5, 379, 285/328

(56) References Cited

U.S. PATENT DOCUMENTS

| | | | | |
|---|---|---|---|---|
| 1,157,695 A | * | 10/1915 | Kast ..................... | 285/334.5 X |
| 1,943,717 A | * | 1/1934 | Barnes ................. | 285/334.5 X |
| 2,035,978 A | * | 3/1936 | Parker .................. | 285/334.5 X |
| 2,123,999 A | * | 7/1938 | Lauer ....................... | 285/334.5 |
| 2,189,566 A | * | 2/1940 | Kreidel ................. | 285/334.5 X |
| 2,191,582 A | * | 2/1940 | Parker ...................... | 285/334.5 |
| 2,439,351 A | * | 4/1948 | Thayer et al. ........ | 285/334.5 X |
| 5,439,259 A | * | 8/1995 | Taga et al. ............... | 285/334.5 |
| 6,045,164 A | * | 4/2000 | Nishio .................. | 285/334.5 X |

* cited by examiner

*Primary Examiner*—Lynne H. Browne
*Assistant Examiner*—David E. Bochna
(74) *Attorney, Agent, or Firm*—Anthony J. Casella; Gerald E. Hespos

(57) ABSTRACT

A flared connection structure of a pipe end portion is provided. The structure includes a bridge flare with a spool portion with a U-shape or V-shape section that bulges outwardly to define front and rear inclined faces. A ring member with a U-shape cross-section has a rear portion disposed in the pocket between the front and rear inclined faces of the spool portion. The ring member also has a front face disposed between the front inclined face of the spool portion and the pressure receiving seat face of a counterpart joint. A pattern of concentric circles formed by recesses and projections is provided on at least one of the faces of the front portion of the ring member or the pressure receiving seat face of the counterpart joint.

7 Claims, 5 Drawing Sheets

FLARED CONNECTION STRUCTURE OF PIPE END PORTION

BACKGROUND OF THE INVENTION

1. Field of the invention

The present invention relates to a flared connection structure of a pipe end portion of a metal pipe for carrying out sealing by being brought into press contact with a pressure receiving seat face of a counterpart joint which is used at a connection end portion of a metal pipe having a comparatively slender diameter and a comparatively thin wall arranged to constitute a supply path for feeding oil or feeding air generally in an automobile or various machines and apparatus, particularly to an improvement in a so-to-speak bridge flare having a spool portion with a section substantially in a U-like shape or a V-like shape constituted by outwardly bulging a section of a pipe end portion of a metal pipe.

2. Description of the prior arts

Conventionally, as shown by FIG. 9, a so-to-speak bridge flare 10 is constituted by a spool portion 11 in which an inclined face 11-1 on a front end portion side of a metal pipe P' is made to rise, an end face of the front end portion constitutes a pressurizing seat face 11-2 for pressurizing a counterpart joint 12 and an inclined face on the rear side constitutes a pressure receiving seat 11-3 for receiving pressure of a fastening nut 13 and a section of which is bulged outwardly to thereby constitute substantially a U-like shape on the inner side.

Further, when the bridge flare 10 is connected to the counterpart joint 12, the pressurizing seat face 11-2 constituted by the end face of the front end portion side of the spool portion 11 is brought into contact with an inclined pressure receiving seat face 12-1 of the counterpart joint 12 and an outer peripheral screw portion 13-1 of the fastening nut 13 is screwed to a screw portion 12-2 of the counterpart joint 12 to thereby bring the pressurizing seat face 11-2 of the end face of the spool portion 11 into press contact with the pressure receiving seat face 12-1 of the counterpart joint 12 for sealing and connection.

However, in recent years, there is a tendency in which pressure of fluid flowing at inside of a pipe is increased and particularly when the above-described bridge flare is used as a supply path of fuel such as CNG (Compressed Natural Gas), there pose the following problems. That is:

Since the pressure of an inner fluid is high, there is a need of increasing fastening torque of the fastening nut 13. In such an occasion, since a pocket portion 11-4 formed on the inner side of the spool portion 11 is hollowed, the pocket portion 11-4 is deformed by axial force produced by the fastening nut 13 and face pressure produced between the pressurizing seat face 11-2 of the spool portion 11 and the pressure receiving seat face 12-1 of the counterpart joint 12 is difficult to increase.

Since the inclined face on the front end portion side of the spool. 11 is made to rise and the end face of the front end portion side constitutes the pressurizing seat face 11-2, there is a case in which a bent portion 11-5 formed on the outer peripheral side of the rise portion becomes unstable in view of a shape thereof and the pressurizing seat face 11-2 is inaccurately brought into contact with the pressure receiving seat face 12-1 of the counterpart joint 12.

Since the inclined face on the front end portion side of the spool portion is made to rise and the end face of the front end portion side constitutes the pressurizing seat face 11-2, a region capable of being used as a seat face is narrow.

The spool portion 11 is formed by chucking the metal pipe P' and pressurizing the end portion in the axial direction by a punch to thereby carry out pressing operation. In pressing the pressurizing seat face 11-2 of the end face, an area thereof which is brought into contact with the punch is extremely narrowed and therefore, large force is exerted on the portion and flaws or the like caused by the punch grow and the portion is significantly roughened by which there is a possibility in which leakage of the inner fluid is caused by deteriorating sealing performance.

SUMMARY OF THE INVENTION

The invention resolves the problem of the conventional technology and it is an object thereof to provide a flared connection structure of a pipe end portion in which a pocket portion formed on an inner side of a spool portion is filled with a ring member to thereby increase supporting force and increase face pressure of a seat face, a pressurizing seat face having a stable shape and a wide area can be formed and a roughened face produced by flaws caused in pressing operation is reduced owing to the wide area of the pressurizing seat face portion to thereby promote sealing performance.

In order to achieve the above-described object, according to an aspect of the invention, there is provided a flared connection structure of a pipe end portion comprising a bridge flare having a spool portion having a section substantially in a U-like shape or a V-like shape produced by bulging the section in an outer direction at a pipe end portion of a metal pipe in which other inclined face of the spool portion formed on a rear side of one inclined face on a front end portion side constitutes a pressure receiving seat face, wherein a separate member of a ring member having a section substantially in a U-like shape is interposed in a pocket portion produced between inner sides of the two inclined faces of the spool portion from the one inclined face and a portion of the ring member provided to cover the one inclined face constitutes a pressure receiving seat face opposed to a pressure receiving seat face of a counterpart joint. Further, according to the flared connection structure, there is formed a recessed and projected face in shapes of concentric circles at a portion of the ring member opposed to the one inclined face on the front end portion side of the spool portion having the section substantially in the U-like shape of the V-like shape, or recessed and projected faces in shapes of concentric circles are respectively formed at the portion of the ring member opposed to the one inclined face on the front end portion side of the spool portion having the section substantially in the U-like shape of the V-like shape and the pressurizing seat face of the ring member opposed to the pressure receiving seat face of the counterpart joint, or a recessed and projected face in shapes of concentric circles is formed on the pressure receiving seat face of the counterpart joint opposed to the pressurizing seat face of the ring member. Further, the ring member is formed by being plated with a soft metal of indium, copper or tin or being coated with a resin of fluororesin or the like.

DETAILED DESCRIPTION OF PREFERRED EMBODIMENTS

Figure 1:
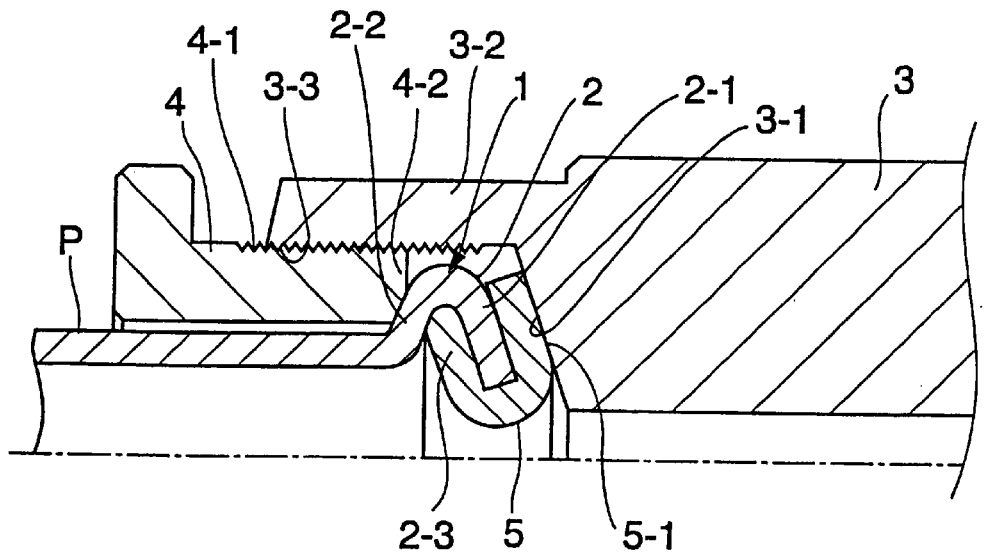
FIG. 1 is a half cut view of a flared connection structure of a pipe end portion according to a first embodiment of the invention.

In FIG. 1 through FIG. 8, notation P designates a metal pipe, numeral 1 designates a bridge flare, numeral 2 designates a spool portion, numeral 3 designates a counterpart joint, numeral 4 designates a fastening male nut, numeral 4' designates a fastening cap nut and numeral 5 designates a ring member.

According to a flared connection structure of a pipe end portion shown by FIG. 1, there is provided a bridge flare 1 in which a spool portion 2 having a section substantially in a U-like shape or a V-like shape produced by bulging the section outwardly at a pipe end portion of a metal pipe P of single seamed, double seamed, seamless or semiseamless which is made of stainless steel, STKM, an aluminum alloy or a copper alloy and other inclined face formed on the rear side of one inclined face 2-1 on the front end portion side constitutes a pressure receiving seat face 2-2.

A separate member of the ring member 5 having a section substantially in a U-like shape comprising copper, aluminum as well as alloys of these pieces, steel or stainless steel and preferably plated with a soft metal of indium, copper or tin or coated with a resin such as fluororesin, is interposed in a pocket portion 2-3 produced between inner sides of the two inclined faces 2-1 and 2-2 of the spool portion from the one inclined face 2-1 on the front end side. A portion on the front end side of the ring member provided to cover the one inclined face 2-1 on the front end portion side, constitutes a pressurizing seat face 5-1 for pressurizing an inclined pressure receiving seat face 3-1 provided at inside of the counterpart joint 3.

Further, according to the embodiment of FIG. 1, in a state in which the inclined pressurizing seat face 5-1 of the ring member 5 of the bridge flare 1 is brought into contact with the pressure receiving seat face 3-1 of the counterpart joint 3, a screw portion 4-1 provided on an outer peripheral face of the fastening male nut 4 which is previously mounted to the metal pipe P, is screwed to fasten to an inside screw 3-3 provided on an inner peripheral face of a cylinder wall 3-2 of the counterpart joint 3, in accordance therewith, a front end portion 4-2 of the fastening male nut 4 pressurizes the pressure receiving seat face 2-2 comprising the inclined face on the rear side of the spool portion 2 having the section substantially in a U-like shape or a V-like shape to thereby bring the pressurizing seat face 5-1 of the ring member 5 into press contact with the pressure receiving seat face 3-1 of the counterpart joint 3 for carrying out the connection while increasing face pressure.

Figure 2:
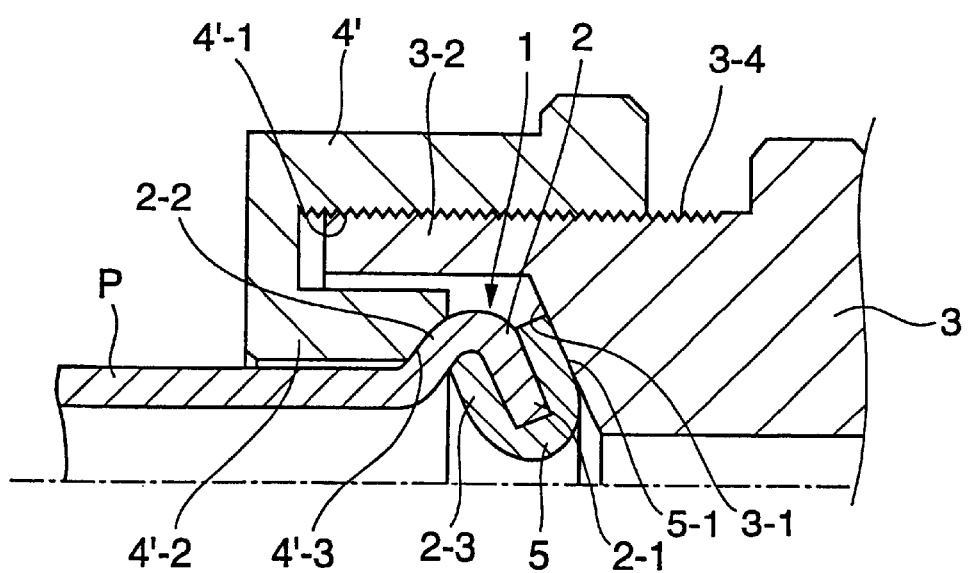
FIG. 2 is a half cut view of a flared connection structure of a pipe end portion according to a second embodiment of the invention.

Next, an embodiment of FIG. 2 shows an example of using a cap nut in place of the fastening male nut of FIG. 1. That is, the embodiment of FIG. 2 is also provided with the bridge flare 1 in which the spool portion 2 having the section substantially in a U-like shape or a V-like shape produced by bulging the section outwardly, is formed at the pipe end portion of the metal pipe P and the other inclined face formed on the rear side of the one inclined face 2-1 on the front end side constitutes the pressure receiving seat face 2-2. Further, the separate member of the ring member 5 having the section substantially in a U-like shape is interposed in the pocket portion 2-3 produced between the inner sides of the two inclined faces 2-1 and 2-2 of the spool portion 2 from the one inclined face 2-1 on the front end side and the portion on the front end portion side of the ring member 5 provided to cover the one inclined face 2-1 on the front end portion side, constitutes the pressurizing seat face 5-1 for pressurizing the inclined pressure receiving seat face 3-1 provided at inside of the counterpart joint 3.

Further, according to the embodiment of FIG. 2, in the case of the fastening cap nut 4' previously mounted to the metal pipe P, in a state in which the inclined pressurizing seat face 5-1 of the ring member 5 of the bridge flare 1 is brought into contact with the pressure receiving seat face 3-1 of the counterpart joint 3, an inside screw portion 4'-1 provided on the inner side of the fastening cap nut 4' is screwed to fasten to an outside screw portion 3-4 provided on an outer peripheral face of the cylinder wall 3-2 of the counterpart joint 3, in accordance therewith, a front end portion 4'-3 of a cylindrical wall 4'-2 projected in the axial direction at inside of the fastening screw nut 4' pressurizes the pressure receiving seat face 2-2 comprising the inclined face on the rear side of the spool portion 2 having the section substantially in a U-like shape or a V-like shape to thereby bring the pressurizing seat face 5-1 of the ring member 5 into press contact with the pressure receiving seat face 3-1 of the counterpart joint 3 for carrying out connection while increasing face pressure.

Figure 3:
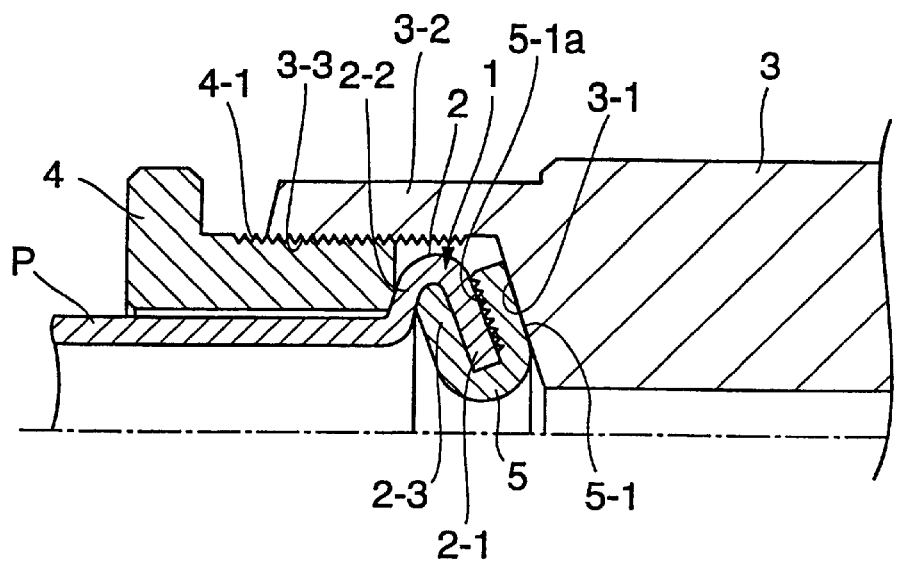
FIG. 3 is a half cut view of a flared connection structure of a pipe end portion according to a third embodiment of the invention.
Figure 4:
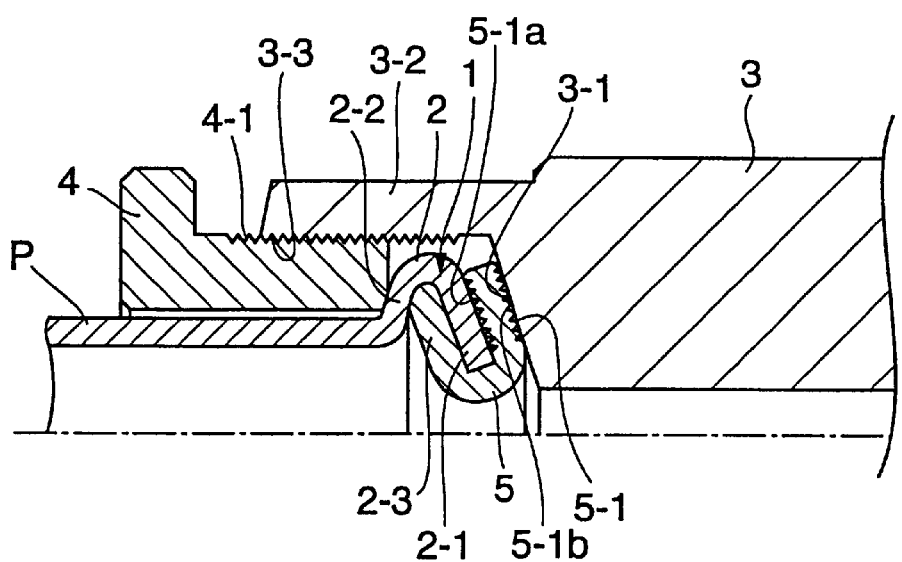
FIG. 4 is a half cut view of a flared connection structure of a pipe end portion according to a fourth embodiment of the invention.

Further, according to embodiments shown by FIG. 3 and FIG. 4, there is adopted a system in which in order to integrate the spool member 2 having the section substantially in a U-like shape or a V-like shape of the bridge flare 1 into contact with the ring member 5 with further excellent sealing performance, the both members are brought into press contact with each other by forming a recessed and projected face in shapes of concentric circles on the side of the ring member 5. According to the embodiment shown by FIG. 3, for example, in the flared connection structure of the pipe end portion shown by FIG. 1, there is formed the spool portion 2 having the section substantially in a U-like shape or a V-like shape produced by bulging the section outwardly at the pipe end portion of the metal pipe P. There is formed a recessed and projected face 5-1a in shapes of concentric circles at the pressurizing seat face 5-1 opposed to the inclined face 2-1 of the spool portion in the ring member 5 having the section substantially in a U-like shape interposed in the pocket portion 2-3 produced between the inner sides of the two inclined faces 2-1 and 2-2 of the spool portion from the one inclined face 2-1 on the front end portion side of the bridge flare 1 constituting the pressure receiving seat face 2-2 by the other inclined face formed on the rear side of the one inclined face 2-1 on the front end side.

According to the embodiment of FIG. 3, in a state in which the inclined pressurizing seat face 5-1 of the ring member 5 of the bridge flare 1 is brought into contact with the pressure receiving seat face 3-1 of the counterpart joint 3, the screw portion 4-1 provided on the outer peripheral face of the fastening male nut 4 previously mounted to the metal pipe P is screwed to fasten to the inside screw portion 3-3 provided at the inner peripheral face of the cylinder wall 3-2 of the counter joint 3, in accordance therewith, the front end portion 4-2 of the fastening male nut 4 pressurizes the pressure receiving seat face 2-2 comprising the inclined face on the rear side of the spool portion 2 having the section substantially in a U-like shape or a V-like shape to thereby bring the pressurizing seat face 5-1 of the ring member 5 into press contact with the pressure receiving seat face 3-1 of the counterpart joint 3 for carrying out connection while increasing face pressure. Further, the connection is carried out by further promoting the sealing performance by bringing about a state in which the recessed and projected face 5-1a in shape of concentric circles formed at the pressurizing seat face 5-1 opposed to the inclined face 2-1 of the spool portion, sufficiently conforms to or bites the inclined face 2-1.

Further, according to the embodiment of FIG. 4, in the flared connection structure of the pipe end portion shown by FIG. 1, there is formed the spool portion 2 having the section substantially in a U-like shape or a V-like shape produced by bulging the section outwardly at the pipe end portion of the metal pipe P. There are formed recessed and projected faces 5-1a and 5-1b respectively in shapes of concentric circles at the pressurizing seat face 5-1 opposed to the inclined face 2-1 of the spool portion and the pressurizing seat face 5-1 opposed to the pressure receiving seat face 3-1 of the counterpart joint 3, in the ring member 5 having the section substantially in a U-like shape interposed in the pocket portion 2-3 produced between the inner sides of the two inclined faces 2-1 and 2-2 of the spool portion from the one inclined face 2-1 on the front end portion side of the bridge flare 1 constituting the pressure receiving seat face 2-2 by the other inclined face formed on the rear side of the one inclined face 2-1 on the front end portion side.

According to the embodiment of FIG. 4, in the state in which the inclined pressurizing seat face 5-1 of the ring member 5 of the bridge flare 1 is brought into contact with the pressure receiving the seat face 3-1 of the counterpart joint 3, the screw portion 4-1 provided on the outer peripheral face of the fastening male nut 4 previously mounted to the metal pipe P is screwed to fasten to the inside screw portion 3-3 provided on the inner peripheral face of the cylindrical wall 3-2 of the counterpart joint 3, in accordance therewith, the front end portion 4-2 of the fastening male nut 4 pressurizes the pressure receiving seat face 2-2 comprising the inclined face on the rear side of the spool portion 2 having the section substantially in a U-like shape or a V-likes shape to thereby bring the pressurizing seat face 5-1 of the ring member 5 into press contact with the pressure receiving seat face 3-1 of the counterpart joint 3 for carrying out connection while increasing face pressure. Further, the connection is carried out by further promoting the sealing performance by bringing about a state in which the recessed and the projected faces 5-1a and 5-1b in shapes of concentric circles formed on the pressurizing seat faces 5-1 respectively opposed to the inclined face 2-1 of the spool portion and the pressure receiving seat face 3-1 of the counterpart joint 3, sufficiently conform to or bite the inclined face 2-1 and the pressure receiving seat face 3-1.

Further, although the recessed and projected faces in shapes of concentric circles are preferably formed on both faces of the inclined face 2-1 and the pressurizing seat face 5-1 of the spool portion as shown by FIG. 4, it is preferable to form the recessed and projected face at least on the pressure receiving seat face 3-1 of the counterpart joint 3 to ensure the sealing performance.

Figure 5:
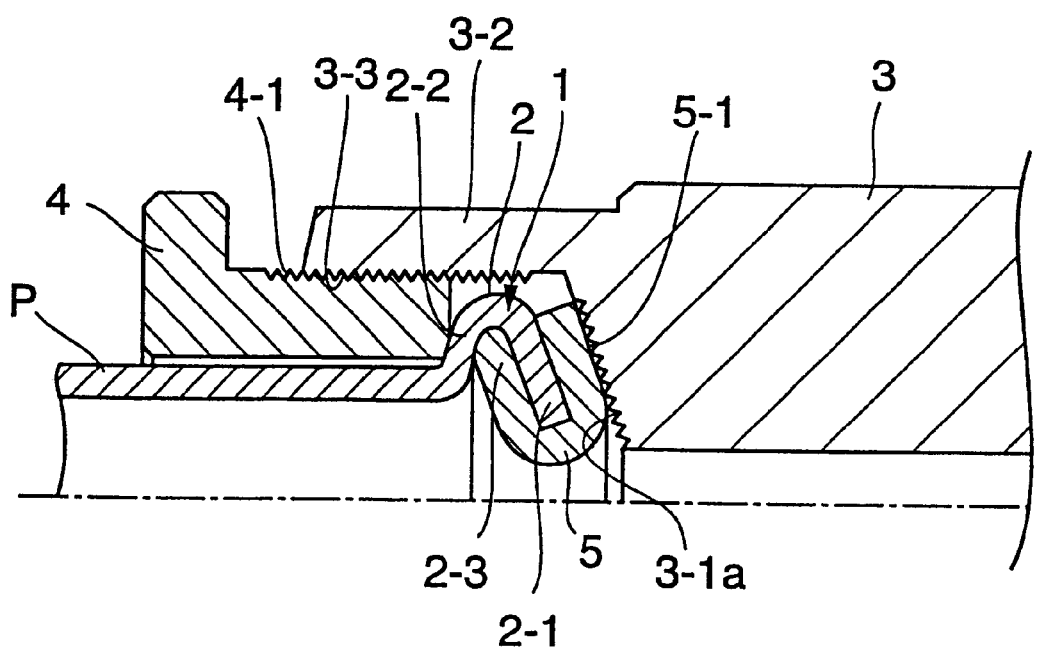
FIG. 5 is a half cut view of a flared connection structure of a pipe end portion according to a fifth embodiment of the invention.

Further, according to an embodiment of FIG. 5, in the flared connection structure of the pipe end portion shown by FIG. 1, there is formed the spool portion 2 having the section substantially in a U-like shape or a V-like shape produced by bulging the section outwardly at the pipe end portion of the metal pipe P and there is formed a recessed and projected face 3-1a on the pressure receiving seat face 3-1 of the counterpart joint 3 opposed to the pressurizing seat face 5-1 of the ring member 5 having the section substantially in a U-like shape interposed in the pocket portion 2-3 produced between the inner sides of the two inclined faces 2-1 and 2-2 from the one inclined face 2-1 on the front end portion side of the bridge flare 1 constituting the pressure receiving seat face 2-2 by the other inclined face formed on the rear side of the one inclined face 2-1 on the front end portion side.

According to the embodiment of FIG. 5, in the state in which the inclined pressurizing seat face 5-1 of the ring member 5 of the bridge flare 1 is brought into contact with the pressure receiving seat face 3-1 of the counterpart joint 3, the screw portion 4-1 provided on the outer peripheral face of the fastening male nut 4 previously mounted to the metal pipe P is screwed to fasten to the inside screw portion 3-3 provided on the inner peripheral face of the cylindrical wall 3-2 of the counter part joint 3, in accordance therewith, the front end portion 4-2 of the fastening male nut 4 pressurizes the pressure receiving seat face 2-2 comprising the inclined face on the rear side of the spool portion 2 having the section substantially in a U-like shape or a V-like shape to thereby bring the pressurizing seat face 5-1 of the ring member 5 into press contact with the pressure receiving seat face 3-1 of the counterpart joint 3 for carrying out connection while promoting face pressure. Further, the connection is carried out by further promoting the sealing performance by bringing about a state in which the recessed and projected face 3-1a in shapes of concentric circles formed on the pressure receiving seat face 3-1 of the counterpart joint 3 opposed to the pressurizing seat face 5-1 of the ring member 5, sufficiently conforms to or bites the pressurizing seat face 5-1.

Figure 6:
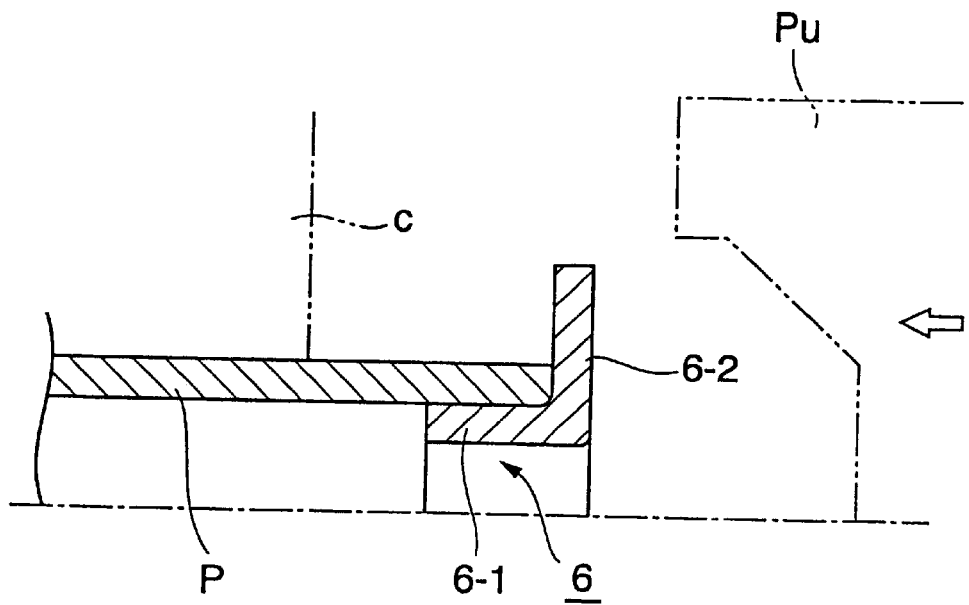
FIG. 6 is a half cut outline view showing an example of a method of forming a flared connection structure of a pipe end portion according to the invention.
Figure 7:
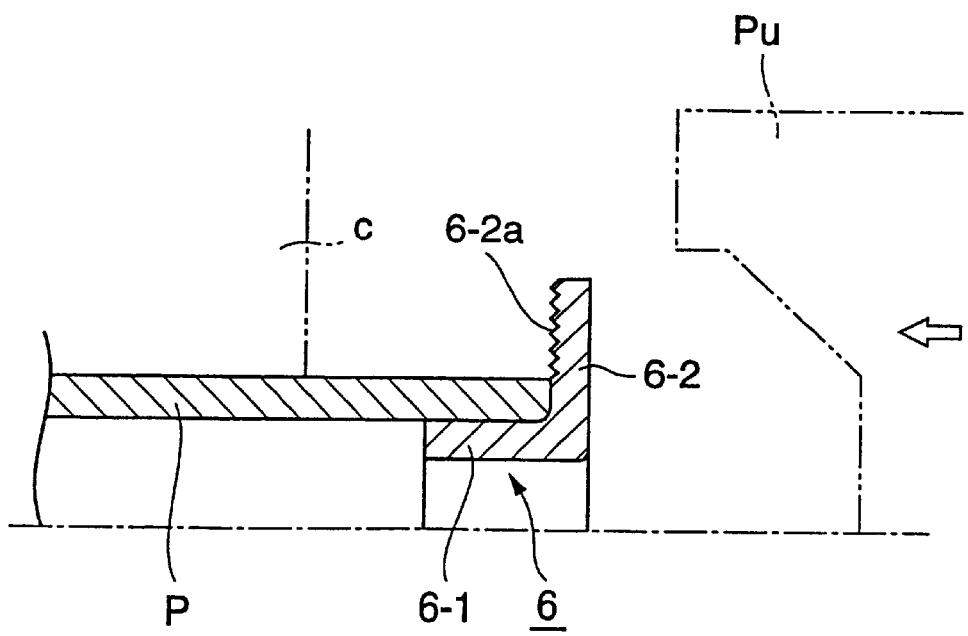
FIG. 7 is a half cut outline view showing other example of a method of forming a flared connection structure of a pipe end portion according to the invention.
Figure 8:
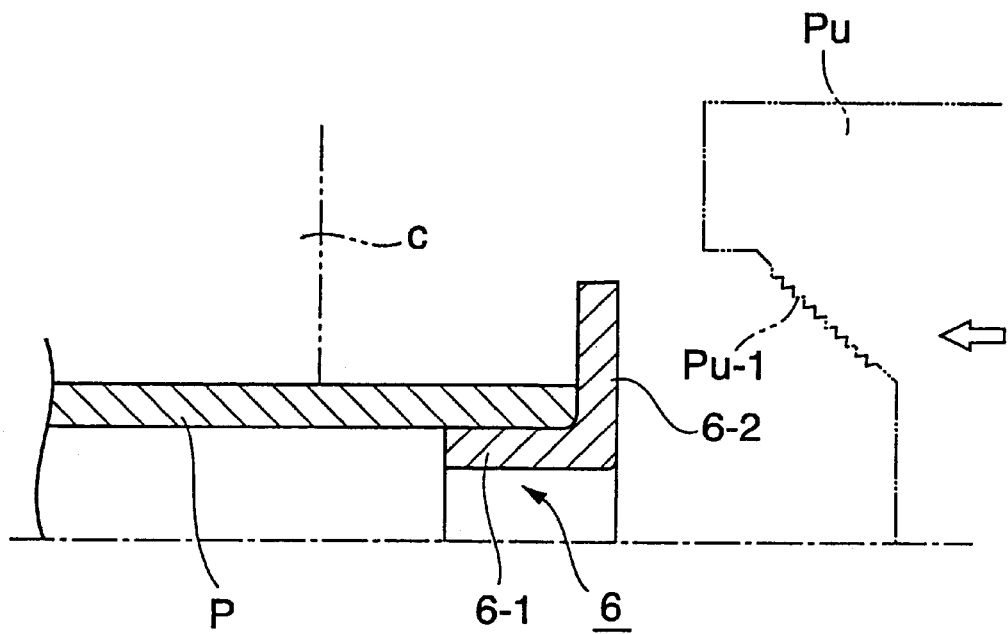
FIG. 8 is a half cut outline view showing other example of a method of forming a flared connection structure of a pipe end portion according to the invention.
Figure 9:
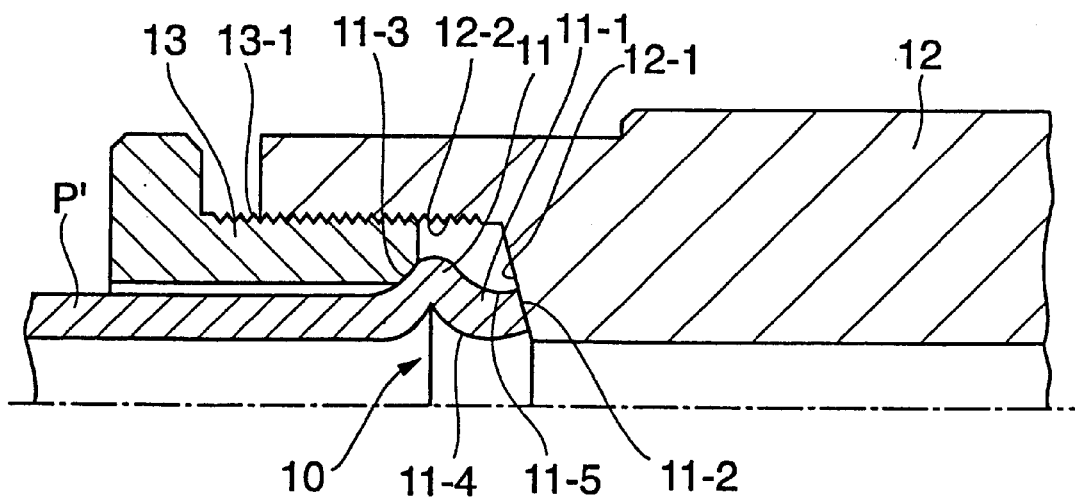
FIG. 9 is a half cut view of a flared connection structure of a pipe end portion according a conventional technology.

Further, the flared connection structure of the pipe end portion according to the invention can easily be formed as shown by FIG. 6, FIG. 7 and FIG. 8. That is, a pipe-like member 6 having a cylindrical main body 6-1 constituting a material of the ring member 5 and a flange portion 6-2 extended from an outer peripheral end portion of the main body 6-1 outwardly in the diameter direction, is held by a chuck C in a state in which the cylindrical main body 6-1 is fitted into the front end portion of the metal pipe P and the flange portion 6-2 is brought into contact with the end face of the front end portion of the metal pipe P, successively, the pipe-like member 6 is pressed in the axial direction of the metal pipe P by a punch Pu to thereby enable to form the pipe-like member 6 and the flared connection structure can be produced by steps which are not significantly different from steps of producing the conventional flared connection structure of the pipe end portion. Further, in cases of the flared connection structures shown by FIG. 3 and FIG. 4, the structures may be formed by previously forming a recessed and projected face 6-2a in shapes of concentric circles at the flange portion 6-2 as shown by FIG. 7 or may be formed by providing a recessed and projected face Pu-1 in shapes of concentric circles on a face of the punch Pu for forming the flared portion and transcribing the recessed and projected face Pu-1 in shapes of concentric circles onto the pressure receiving seat face 5-1 of the ring member 5 in the forming operation as shown by FIG. 8. In the case of the flared connection structure shown by FIG. 5, the recessed and projected face 3-1a in shapes of concentric circles may previously be formed on the pressure receiving seat face 3-1 of the counterpart joint 3. The recessed and projected face in shapes of concentric circles can be formed by ring-like projections or the like.

As has been described, according to the invention, the separate member of the ring member having the section substantially in a U-like shape is interposed at the spool portion. Therefore, the pocket portion produced on the inner side of the spool portion is filled with the ring member to thereby constitute a supporting member. Therefore, in fastening to screw the fastening male nut or the fastening cap nut to the counterpart joint, the face pressure at the sealing face can be increased since the spool portion is provided with the high rigidity and is not deformed by receiving axial force. Further, compared with the pressurizing seat face of the end face portion according to the conventional technology, there can be formed the pressure receiving seat face which is stabilized in view of the shape and is provided with a wide area. Further, since the pressurizing seat face portion is provided with the wide area, a roughened face produced by flaws caused in pressing operation can be reduced. Further, the spool member and the ring member can be integrated with further excellent air tight performance by the operation of the recessed and projected face in shapes of concentric circles formed on the side of the ring member or on the side of the counterpart joint opposed to the ring member to thereby enable to provide the flared connection structure of the pipe end portion having further excellent sealing performance.

What is claimed is:

1. A flared connection structure of a pipe end portion comprising:
    a bridge flare having a spool portion having a section substantially in a U-like shape or a V-like shape produced by bulging the section in an outer direction at a front end portion of a metal pipe, the spool portion defining a front inclined face at the front end portion of the metal pipe and a rear inclined face on a rear side of the front inclined face, such that the rear inclined face constitutes a rear pressure receiving seat face; and
    a separate ring member having a section substantially in a U-like shape, the ring member having a rear portion interposed in a pocket portion produced between inner sides of the two inclined faces of the spool portion, the ring member further having a front portion covering the front inclined face to constitute a pressurizing seat face opposed to a pressure receiving seat face of a counterpart joint; wherein a recessed and projected face in shapes of concentric circles is formed at at least one of: a portion of the ring member opposed to the front inclined face on the spool portion; the pressurizing seat face of the ring member; and the pressure receiving seat face of the counterpart joint.

2. The flared connection structure of a pipe end portion according to claim 1:
    wherein the recessed and projected face in the shapes of the concentric circles is formed at the pressure receiving seat face of the counterpart joint opposed to the pressurizing seat face of the ring member.

3. The flared connection structure of a pipe end portion according to claim 1:
    wherein the metal pipe comprises stainless steel, STKM, an aluminum alloy or a copper alloy.

4. The flared connection structure of a pipe end portion according to claim 1:
    wherein the metal pipe comprises a single seamed, a double seamed, a seamless or a semiseamless pipe.

5. The flared connection structure of a pipe end portion according to claim 1:
    wherein the ring member comprises copper, aluminum or an alloy of a copper or aluminum-species, steel or stainless steel.

6. The flared connection structure of a pipe end portion according to claim 5:
    wherein the ring member is plated with a soft metal of indium, copper or thin coated with a resin of fluororesin or the like.

7. The flared connection structure of a pipe end portion according to claim 1:
    wherein a fastening nut for pressurizing the pressure receiving seat face comprises a male nut or a cap nut.

* * * * *